(12) United States Patent
Burghdoff et al.

(10) Patent No.: US 11,054,005 B2
(45) Date of Patent: Jul. 6, 2021

(54) DUAL MODE ACTUATOR

(71) Applicant: The Boeing Company, Chicago, IL (US)

(72) Inventors: Michael J. Burghdoff, Everett, WA (US); Rex E. Estes, Everett, WA (US)

(73) Assignee: The Boeing Company, Chicago, IL (US)

( * ) Notice: Subject to any disclaimer, the term of this patent is extended or adjusted under 35 U.S.C. 154(b) by 247 days.

(21) Appl. No.: 16/000,112

(22) Filed: Jun. 5, 2018

(65) Prior Publication Data

US 2019/0368582 A1 Dec. 5, 2019

(51) Int. Cl.
*F16H 25/20* (2006.01)
*B64D 29/08* (2006.01)
*F15B 15/14* (2006.01)

(52) U.S. Cl.
CPC ............ *F16H 25/20* (2013.01); *B64D 29/08* (2013.01); *F15B 15/14* (2013.01); *F16H 2025/2065* (2013.01)

(58) Field of Classification Search
CPC ............ F16H 25/20; F16H 2025/2065; F16H 2025/2071; F15B 15/14; F15B 15/1447; B64D 29/08
See application file for complete search history.

(56) References Cited

U.S. PATENT DOCUMENTS

| | | | | |
|---|---|---|---|---|
| 2,484,603 | A | * | 10/1949 | Audemar ................ B64C 25/22 416/47 |
| 6,408,740 | B1 | * | 6/2002 | Holt ...................... F15B 11/123 91/173 |
| 2005/0040284 | A1 | * | 2/2005 | Christensen ............ F02K 1/763 244/101 |
| 2013/0312387 | A1 | | 11/2013 | West et al. |
| 2015/0060602 | A1 | * | 3/2015 | Naubert ................ F16H 25/205 244/99.3 |

(Continued)

FOREIGN PATENT DOCUMENTS

EP 2868908 5/2015

OTHER PUBLICATIONS

Extended European Search Report for EP Patent Application No. 19171021.1 dated Oct. 29, 2019.

*Primary Examiner* — Joseph J Hail
*Assistant Examiner* — J Stephen Taylor
(74) *Attorney, Agent, or Firm* — Kunzler Bean & Adamson

(57) ABSTRACT

A retractable component actuator that comprises a first portion, fixable to a fixed component and comprising a first engagement feature, and a second portion, fixable to a retractable component and comprising a second engagement feature releasably supportable on the first engagement feature. The retractable component actuator further comprises an automated drive mechanism operable to move the first engagement feature upward and downward relative to the fixed component when the first portion is fixed to the fixed component. Downward movement of the second engagement feature relative to the first engagement feature is constrained by the first engagement feature. Upward movement of the second engagement feature relative to the first engagement feature is unconstrained by the first engagement feature. The second engagement feature is upwardly and downwardly co-movable, relative to the fixed component, with the first engagement feature.

20 Claims, 10 Drawing Sheets

(56) References Cited

U.S. PATENT DOCUMENTS

| | | | |
|---|---|---|---|
| 2018/0087634 A1* | 3/2018 | Muster | F16H 25/2204 |
| 2018/0222599 A1* | 8/2018 | Papadopoulos | F15B 19/005 |
| 2019/0063568 A1* | 2/2019 | Laskovy | B64C 13/505 |
| 2019/0135447 A1* | 5/2019 | John | B64D 29/08 |

* cited by examiner

DUAL MODE ACTUATOR

FIELD

This disclosure relates generally to actuators, and more particularly to a dual mode actuator for opening and closing a door of an engine nacelle of an aircraft.

BACKGROUND

External engines of aircraft are protected by nacelles that at least partially encase and protect internal parts of the external engines. Such a nacelle commonly includes one or more cowling doors that are openable to expose internal parts of the external engines for inspection, repair, or maintenance. Because the doors can be heavy, some nacelles include power door opening systems that power-assist the opening and closing of the doors.

Conventional power door opening systems are prone to jamming or malfunction. Some conventional power door opening systems can be operated manually in the event of jamming or malfunction. For other conventional power door opening systems, extra doors are added to the nacelle to provide access to jammed or malfunctioning systems.

Manually operating certain conventional power door opening systems can introduce unintended consequences. For example, manually operating a hydraulic actuator may result in the entrainment of air into the hydraulic actuator, which would negative affect the performance of the hydraulic actuator. To prevent the entrainment of air, some conventional power door opening systems added pumps, check valves, and additional fluid, which also added to the cost, complexity, and weight of such systems. Similarly, adding extra doors increases the cost, complexity, and weight of the nacelles.

SUMMARY

The subject matter of the present application has been developed in response to the present state of the art, and in particular, in response to the shortcomings of power door opening systems, that have not yet been fully solved by currently available techniques. Accordingly, the subject matter of the present application has been developed to provide a retractable component actuator and associate method that overcome at least some of the above-discussed shortcomings of prior art techniques. More specifically, in some examples, the retractable component actuator of the present disclosure saves weight, reduces complexity, increases reliability, and reduces maintenance time and cost compared to prior art systems.

Disclosed herein is a retractable component actuator that comprises a first portion. The first portion is fixable to a fixed component and comprises a first engagement feature. The retractable component actuator also comprises a second portion that is fixable to a retractable component and comprises a second engagement feature releasably supportable on the first engagement feature. The retractable component actuator further comprises an automated drive mechanism operably coupled to the first portion and operable to move the first engagement feature upward and downward relative to the fixed component when the first portion is fixed to the fixed component. Downward movement of the second engagement feature relative to the first engagement feature is constrained by the first engagement feature. Upward movement of the second engagement feature relative to the first engagement feature is unconstrained by the first engagement feature. When the second engagement feature is supported on the first engagement feature and the first portion is fixed to the fixed component, the second engagement feature is upwardly and downwardly co-movable, relative to the fixed component, with the first engagement feature. The preceding subject matter of this paragraph characterizes example 1 of the present disclosure.

The second engagement feature is biased into supportable contact with the first engagement feature by gravity. The preceding subject matter of this paragraph characterizes example 2 of the present disclosure, wherein example 2 also includes the subject matter according to example 1, above.

The second engagement feature is freely manually movable upwardly away from the first engagement feature. The preceding subject matter of this paragraph characterizes example 3 of the present disclosure, wherein example 3 also includes the subject matter according to any one of examples 1-2, above.

When the first portion is fixed to the fixed component, the retractable component actuator is operable in a manual mode and a power mode to move the second engagement feature upwardly away from the fixed component. The manual mode comprises separating the second engagement feature upwardly away from the first engagement feature. The power mode comprises upwardly co-moving the first engagement feature and the second engagement feature via the automated drive mechanism. The preceding subject matter of this paragraph characterizes example 4 of the present disclosure, wherein example 4 also includes the subject matter according to any one of examples 1-3, above.

The first portion further comprises a threaded rod. The first engagement feature comprises a sleeve threadably engaged with the threaded rod. Rotation of the threaded rod relative to the sleeve translates the sleeve along the threaded rod and moves the sleeve relative to the fixed component when the first portion is fixed to the fixed component. The preceding subject matter of this paragraph characterizes example 5 of the present disclosure, wherein example 5 also includes the subject matter according to any one of examples 1-4, above.

The second portion comprises a hollow tube. The second engagement feature is non-movably coupled to the hollow tube. The threaded rod extends through and is rotatable relative to the hollow tube. The preceding subject matter of this paragraph characterizes example 6 of the present disclosure, wherein example 6 also includes the subject matter according to example 5, above.

When the second engagement feature is supported on the first engagement feature, rotation of the threaded rod relative to the sleeve and the hollow tube translates the hollow tube along the threaded rod and moves the threaded rod relative to the fixed component when the first portion is fixed to the fixed component. The preceding subject matter of this paragraph characterizes example 7 of the present disclosure, wherein example 7 also includes the subject matter according to example 6, above.

The hollow tube is slidably non-threadably engaged with the threaded rod. The preceding subject matter of this paragraph characterizes example 8 of the present disclosure, wherein example 8 also includes the subject matter according to any one of examples 6-7, above.

When the first portion is fixed to the fixed component and the second portion is fixed to the retractable component, the threaded rod is rotatable relative to the fixed component and the retractable component and the hollow tube is non-rotatable relative to the fixed component and the retractable component. Furthermore, when the second engagement feature is supported on the first engagement feature, the sleeve is non-rotatable relative to the fixed component and the retractable component. The preceding subject matter of this paragraph characterizes example 9 of the present disclosure, wherein example 9 also includes the subject matter according to any one of examples 6-8, above.

The first engagement feature further comprises first tongues and first grooves formed in the sleeve. The second engagement feature further comprises second tongues and second grooves formed in the hollow tube. The first tongues engage corresponding second grooves and the second tongues engage corresponding first grooves to releasably engage the first portion and the second portion. The preceding subject matter of this paragraph characterizes example 10 of the present disclosure, wherein example 10 also includes the subject matter according to example 9, above.

Engagement between the first tongues and the second grooves and engagement between the second tongues and the first grooves prevents relative rotation between the sleeve and the hollow tube. The preceding subject matter of this paragraph characterizes example 11 of the present disclosure, wherein example 11 also includes the subject matter according to example 10, above.

When the second engagement feature is not supported on the first engagement feature, the sleeve is rotatable relative to the fixed component and the retractable component. The preceding subject matter of this paragraph characterizes example 12 of the present disclosure, wherein example 12 also includes the subject matter according to any one of examples 9-11, above.

The automated drive mechanism comprises a rotary power generator. The preceding subject matter of this paragraph characterizes example 13 of the present disclosure, wherein example 13 also includes the subject matter according to any one of examples 5-12, above.

The first portion further comprises a chamber housing. The first engagement feature comprises a first piston within, translationally movable along, and sealed to the chamber housing. The second portion further comprises a second piston within and translationally movable along the chamber housing. The second portion further comprise a rod co-movably coupled to the second piston and fixable to the retractable component. The preceding subject matter of this paragraph characterizes example 14 of the present disclosure, wherein example 14 also includes the subject matter according to any one of examples 1-4, above.

The automated drive mechanism comprises a linear actuator. The preceding subject matter of this paragraph characterizes example 15 of the present disclosure, wherein example 15 also includes the subject matter according to example 14, above.

Further disclosed herein is a nacelle for an engine of an aircraft. The nacelle comprises a base. The nacelle also comprises a door movably coupled to the base and movable between a closed position and an open position. The nacelle further comprises a retractable component actuator coupled to and extending between the door and at least one of the base and the engine. The retractable component actuator is operable to move the door between the closed position and the open position. The retractable component actuator comprises a first portion fixable to a fixed component and comprising a first engagement feature. The retractable component actuator also comprises a second portion fixable to a retractable component and comprising a second engagement feature releasably supportable on the first engagement feature. The retractable component actuator further comprises an automated drive mechanism operably coupled to the first portion and operable to move the first engagement feature upward and downward relative to the fixed component when the first portion is fixed to the fixed component. Downward movement of the second engagement feature relative to the first engagement feature is constrained by the first engagement feature. Upward movement of the second engagement feature relative to the first engagement feature is unconstrained by the first engagement feature. When the second engagement feature is supported on the first engagement feature and the first portion is fixed to the fixed component, the second engagement feature is upwardly and downwardly co-movable, relative to the fixed component, with the first engagement feature. The preceding subject matter of this paragraph characterizes example 16 of the present disclosure.

The door applies a downward compressive load onto the second portion. The downward compressive load biases the second engagement feature into supportable contact with the first engagement feature. The preceding subject matter of this paragraph characterizes example 16 of the present disclosure, wherein example 16 also includes the subject matter according to example 17, above.

Also disclosed herein is a method of actuating a retractable component relative to a fixed component. The method comprises applying a downward compressive load to a second portion of a retractable component actuator to bias a second engagement feature of the second portion into supportable contact with a first engagement feature of a first portion of the retractable component actuator. The method also comprises moving the first engagement feature relative to the fixed component, with the second engagement feature supported on the first engagement feature, to move the second engagement feature and the retractable component relative to the fixed component. The method further comprises applying an upward tensile load, greater than the downward compressive load, to the second portion of the retractable component actuator to separate the second engagement feature from the first engagement feature and move the second engagement feature and the retractable component relative to the first engagement feature and the fixed component. The preceding subject matter of this paragraph characterizes example 18 of the present disclosure.

The first portion further comprises a threaded rod. The first engagement feature comprises a sleeve threadably engaged with the threaded rod. The second portion comprises a hollow tube fixed to the retractable component. The second engagement feature is non-movably coupled to the hollow tube. The threaded rod extends through and is rotatable relative to the hollow tube. Moving the first engagement feature relative to the fixed component comprises rotating the threaded rod relative to the sleeve to translate the sleeve and the hollow tube along the threaded rod. The preceding subject matter of this paragraph characterizes example 19 of the present disclosure, wherein example 19 also includes the subject matter according to example 18, above.

The first portion further comprises a chamber housing. The first engagement feature comprises a first piston within, translationally movable along, and sealed to the chamber housing. The second portion further comprises a second piston within and translationally movable along the chamber housing. The second portion further comprises a rod co-movably coupled to the second piston and fixed to the retractable component. Moving the first engagement feature relative to the fixed component comprises hydraulically driving the first piston and the second piston along the chamber housing. The preceding subject matter of this paragraph characterizes example 20 of the present disclosure, wherein example 20 also includes the subject matter according to example 18, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
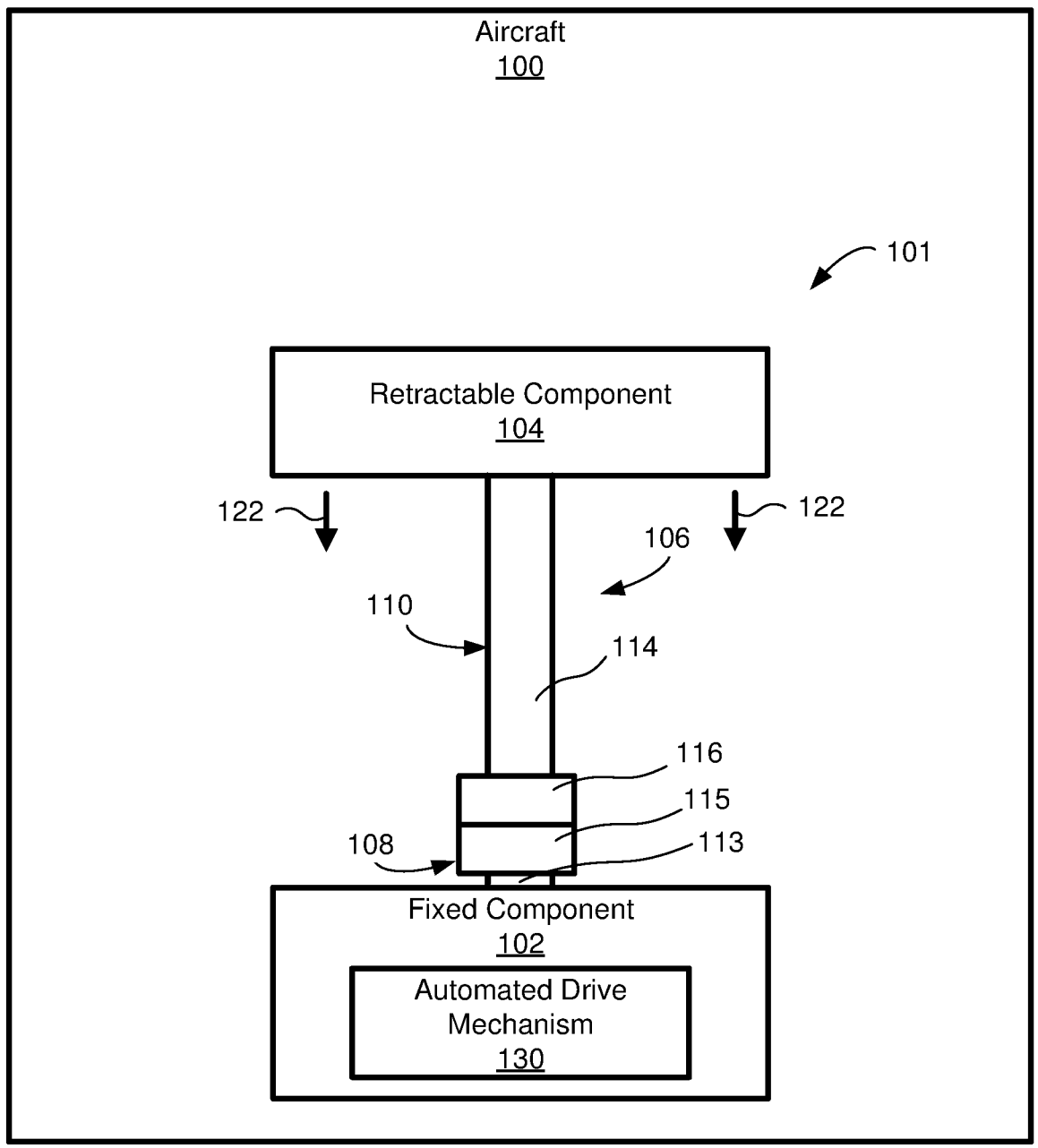
FIG. 1 is a schematic block diagram of an aircraft with a retractable component system, according to one or more examples of the present disclosure.
Figure 2:
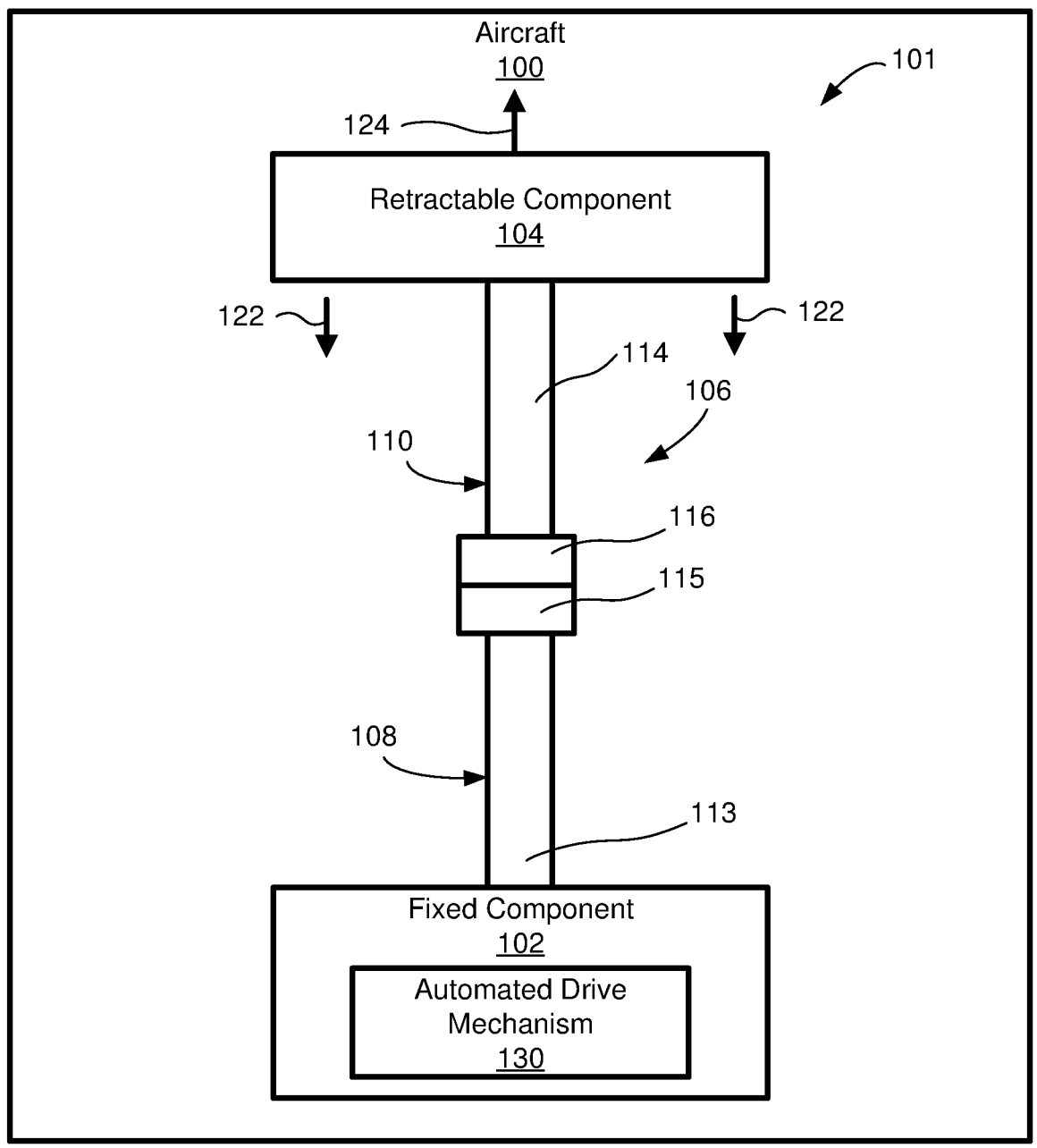
FIG. 2 is a schematic block diagram of the aircraft of FIG. 1, shown operating in a power mode, according to one or more examples of the present disclosure.
Figure 3:
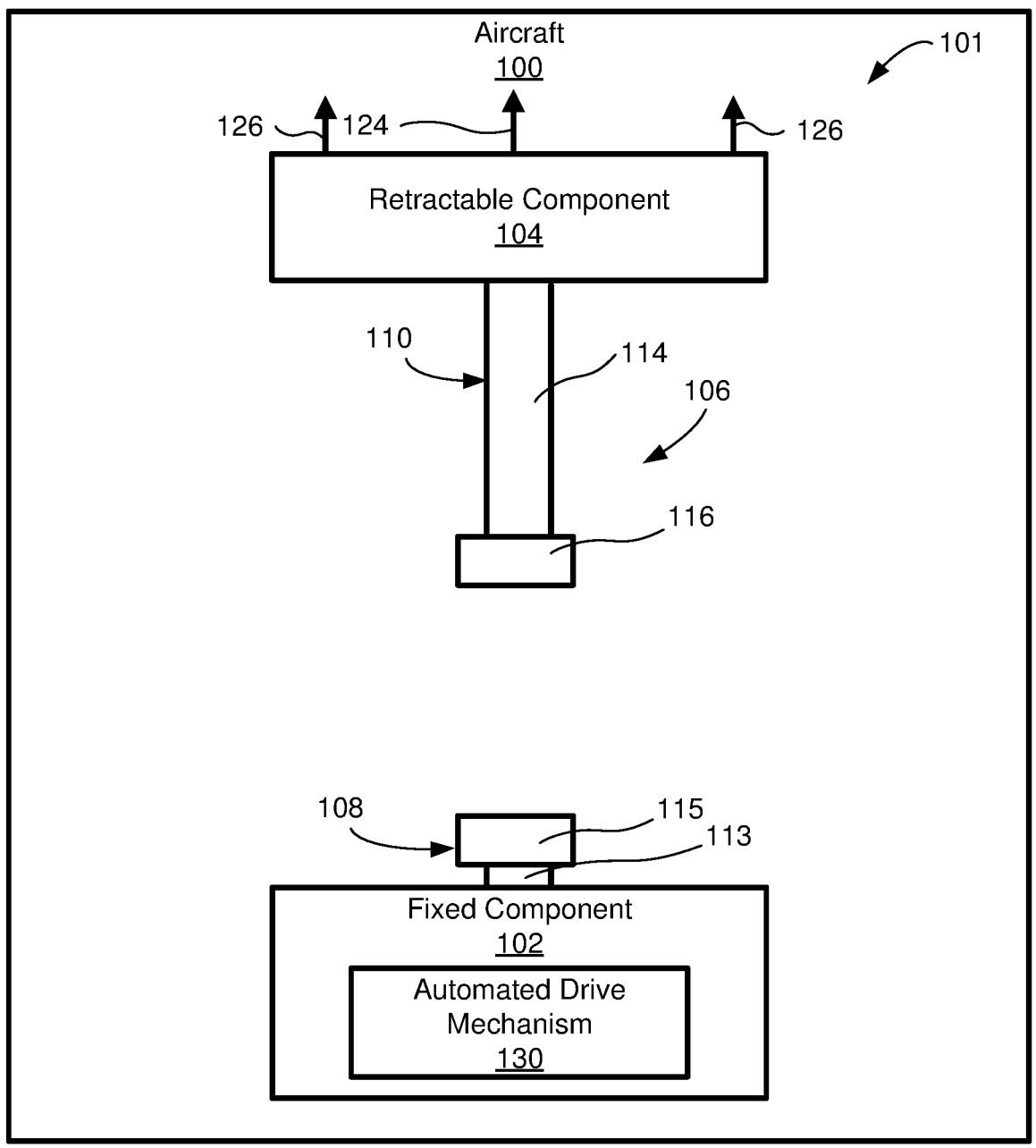
FIG. 3 is a schematic block diagram of the aircraft of FIG. 1, shown operating in a manual mode, according to one or more examples of the present disclosure.

Referring to FIGS. 1-3, according to some embodiments, a retractable component system 101 includes a fixed component 102 and a retractable component 104. The retractable component 104 is actuatable (e.g., movable) between a first position (e.g., closed position) and a second position (e.g., open position) relative to the fixed component 102. Actuation of the retractable component 104 is facilitated by a retractable component actuator 106 (i.e., dual mode actuator) coupled to and extending between the fixed component 102 and the retractable component 104. The retractable component system 101 can be a sub-system of another system. For example, the retractable component system 101 can form part of an aircraft 100. In other example, the retractable component system 101 forms part of another type of mobile structure, such as an automobile, watercraft, spacecraft, and the like. According to some examples, the retractable component system 101 forms part of a non-mobile structure, such as a building, machinery, and the like.

The fixed component 102 is fixed relative to the retractable component 104. In other words, the fixed component 102 is fixed because the retractable component 104 is movable relative to the fixed component 102. Accordingly, the fixed component 102 need not be a stationary object, such as a part of a building, but can be a movable object, such as a component on an aircraft.

The retractable component 104 may be directly or indirectly movably coupled to the fixed component 102. For example, the retractable component 104 can be hingedly coupled to the fixed component 102, such as a door being hingedly coupled to a panel. However, in some examples, the retractable component 104 is movably coupled to the fixed component 102 via one or more components interconnecting the retractable component 104 and the fixed component 102.

The retractable component 104 is also interconnected to the fixed component 102 by the retractable component actuator 106. Generally, the retractable component actuator 106 is configured and selectively operable to move the retractable component 104 relative to the fixed component 102.

The retractable component actuator 106 includes a first portion 108 that is fixable (e.g., configured to be fixed) to the fixed component 102. The first portion 108 includes a first coupling 113 and a first engagement feature 115. The first coupling 113 is coupled to the fixed component 102 and the first engagement feature 115 is coupled to the first coupling 113. In this manner, the first engagement feature 115 is coupled to the fixed component 102.

The retractable component actuator 106 also includes a second portion 110 that is fixable to the retractable component 104. The second portion 110 includes a second coupling 114 and a second engagement feature 116. The second coupling 114 is coupled to the retractable component 104 and the second engagement feature 116 is coupled to the second coupling 114. In this manner, the second engagement feature 116 is coupled to the retractable component 104. The second coupling 114 is co-movably coupled to the retractable component 104, when fixed to the retractable component 104, such that movement of the second coupling 114 results in movement of the retractable component 104.

The retractable component system 101 is configured to apply a compressive load 122, from the retractable component 104 towards the fixed component 102, to the second portion 110. The compressive load 122 biases or urges the second engagement feature 116 into supportable contact with the first engagement feature 115. The second portion 110 of the retractable component actuator 106 is freely movable away from and toward the first portion 108 within a range partially constrained by the first engagement feature 115. More specifically, the first engagement feature 115 constrains movement of the second portion 110 toward the first portion 108 but does not constrain movement of the second portion 110 away from the first portion 108. In some examples, the retractable component 104 is positioned above the retractable component actuator 106 and the source of the compressive load 122 is the weight of the retractable component 104 bearing down on the retractable component actuator 106. In other words, the second engagement feature 116 is biased into supportable contact with the first engagement feature 115 by gravity. According to such examples, movement of the second portion 110 toward the first portion 108 (e.g., downward movement) is constrained by the first engagement feature 115; and movement of the second portion 110 away from the first portion 108 (e.g., upward movement) is unconstrained by the first engagement feature 115.

The first engagement feature 115 constrains movement of the second portion 110 toward the first portion 108 by contacting and stopping the second engagement feature 116. When movement of the second portion 110 toward the first portion 108 is a downward movement, the first engagement feature 115 constrains movement of the second portion 110 toward the first portion 108 by supporting the second engagement feature 116 on the first engagement feature 115. Because the upward movement, or movement of the second portion 110 away from the first portion 108, is unconstrained by the first engagement feature 115, but downward movement, or movement of the second portion 110 toward the first portion 108, is constrained via contact with the first engagement feature 115, the second engagement feature 116 can be defined as being releasably supportable on the first engagement feature 115.

When the second engagement feature 116 is supported on (e.g., in supportable contact with) the first engagement feature 115 and the first portion 108 is fixed to the fixed component 102, the second portion 110, and thus the second engagement feature 116, is upwardly and downwardly co-movable, relative to the fixed component 102, with the first engagement feature 115. In other words, when the second engagement feature 116 is supported on the first engagement feature 115, upward movement of the first engagement feature 115 results in upward movement of the second engagement feature 116 and thus the second coupling 114. In contrast, when the second engagement feature 116 is supported on the first engagement feature 115, downward movement of the first engagement feature 115 results in downward movement of the second engagement feature 116 and thus the second coupling 114.

Movement of the first engagement feature 115 relative to the fixed component 102 is facilitated by an automated drive mechanism 130 of the retractable component actuator 106. In other words, the automated drive mechanism 130 is operable to move (e.g., upwardly and downwardly) the first engagement feature 115 of the first portion 108 relative to the fixed component 102. The automated drive mechanism 130 is operably coupled to the first portion 108. For example, the automated drive mechanism 130 can be indirectly coupled to the first engagement feature 115, such as via the first coupling 113, or directly coupled to the first engagement feature 115. In some implementations, the automated drive mechanism 130 is coupled to the fixed component 102. For example, the automated drive mechanism 130 is fixedly coupled to or integrated into the fixed component 102. However, in other examples, the automated drive mechanism 130 is separate from the fixed component 102.

As presented, when supported on the first engagement feature 115, movement of the second engagement feature 116 is driven by movement of the first engagement feature 115. However, while supportable contact between the first engagement feature 115 and the second engagement feature 116 ensures the second engagement feature 116 moves when the first engagement feature 115 moves and separation of the second engagement feature 116 downwardly away from the first engagement feature 115 is prevented, such supportable contact does not prevent the second engagement feature 116 from separating upwardly away from the first engagement feature 115. Accordingly, the second engagement feature 116 is freely movable (e.g., via manual or assisted power) upwardly away from the first engagement feature 115. Therefore, the second engagement feature 116 and thus the retractable component 104 can be freely moved upwardly away from the fixed component 102 independent of operation of the automated drive mechanism 130.

In view of the foregoing, the retractable component actuator 106 is operable in a power mode and a manual mode to move the second engagement feature 116 and the retractable component 104 relative to the fixed component 102. Because the retractable component actuator 106 is operable in a power mode and a manual mode, the retractable component actuator 106 is considered a dual mode actuator. Referring to FIGS. 1 and 2, in the power mode, the compressive load 122 is sufficient that there is a net compressive force acting on the second portion 110. The net compressive force resulting from the compressive load 122 forces the second engagement feature 116 to be supported on (or placed into supportable contact with) the first engagement feature 115. In the power mode, movement of the second engagement feature 116 is achieved by moving the first engagement feature 115 via operation of the automated drive mechanism 130. The automated drive mechanism 130 is operable to extend or raise, as indicated by directional arrow 124, the first engagement feature 115 and the second engagement feature 116. Additionally, the automated drive mechanism 130 is operable to retract or lower, in a direction opposite the directional arrow 124, the first engagement feature 115 and the second engagement feature 116. Operation of the automated drive mechanism 130 can be controlled manually or automatically via a controller onboard the aircraft 100, near the aircraft 100, or remote from the aircraft 100.

Referring to FIG. 3, in the manual mode, a net tensile force is acting on the second portion 110. In some examples, because the compressive load 122, generated by some portion of the weight of the retractable component 104, is constant, the net tensile force is created by applying an upward tensile load 126 to the second portion 110 that is greater than the compressive load 122. Because the contact or engagement between the first engagement feature 115 and the second engagement feature 116 does not constrain movement of the second engagement feature 116 upwardly away from the first engagement feature 115, once the upward tensile load 126 exceeds the compressive load 122 and a net tensile force is acting on the second portion 110, the second engagement feature 116 separates upwardly away from the first engagement feature 115. Such upward separation of the second engagement feature 116 results in the retractable component 104 being raised upwardly relative to the fixed component 102, as indicated by directional arrow 124, without operation of the automated drive mechanism 130 and movement of the first engagement feature 115. When separated, the upward tensile load 126 can also be decreased to reduce the net tensile force and lower the second engagement feature 116, and thus the retractable component 104, toward the first engagement feature 115, and thus the fixed component 102.

In the manual mode, the tensile load is generated by a power source other than the automated drive mechanism 130. The power source can be a manual power source, such as one or more human operators. Alternatively, the power source can be a non-manual power source, such as a forklift, jack, or other lifting tool.

According to some examples, the retractable component actuator 106 is operated in the power mode to raise (e.g., open) and lower (e.g., close) the retractable component 104 as long as the first portion 108 and the automated drive mechanism 130 are operating properly. Should either of the first portion 108 or the automated drive mechanism 130 malfunction, operation of the retractable component actuator 106 can be switched to the manual mode to raise and lower the retractable component 104 by effectually bypassing the first portion 108 and automated drive mechanism 130. The first portion 108 and the automated drive mechanism 130 experience a malfunction in a variety of ways, such as binding of the first engagement feature 115, disablement of the automated drive mechanism 130, power loss to the automated drive mechanism 130, and the like.

Figure 16:
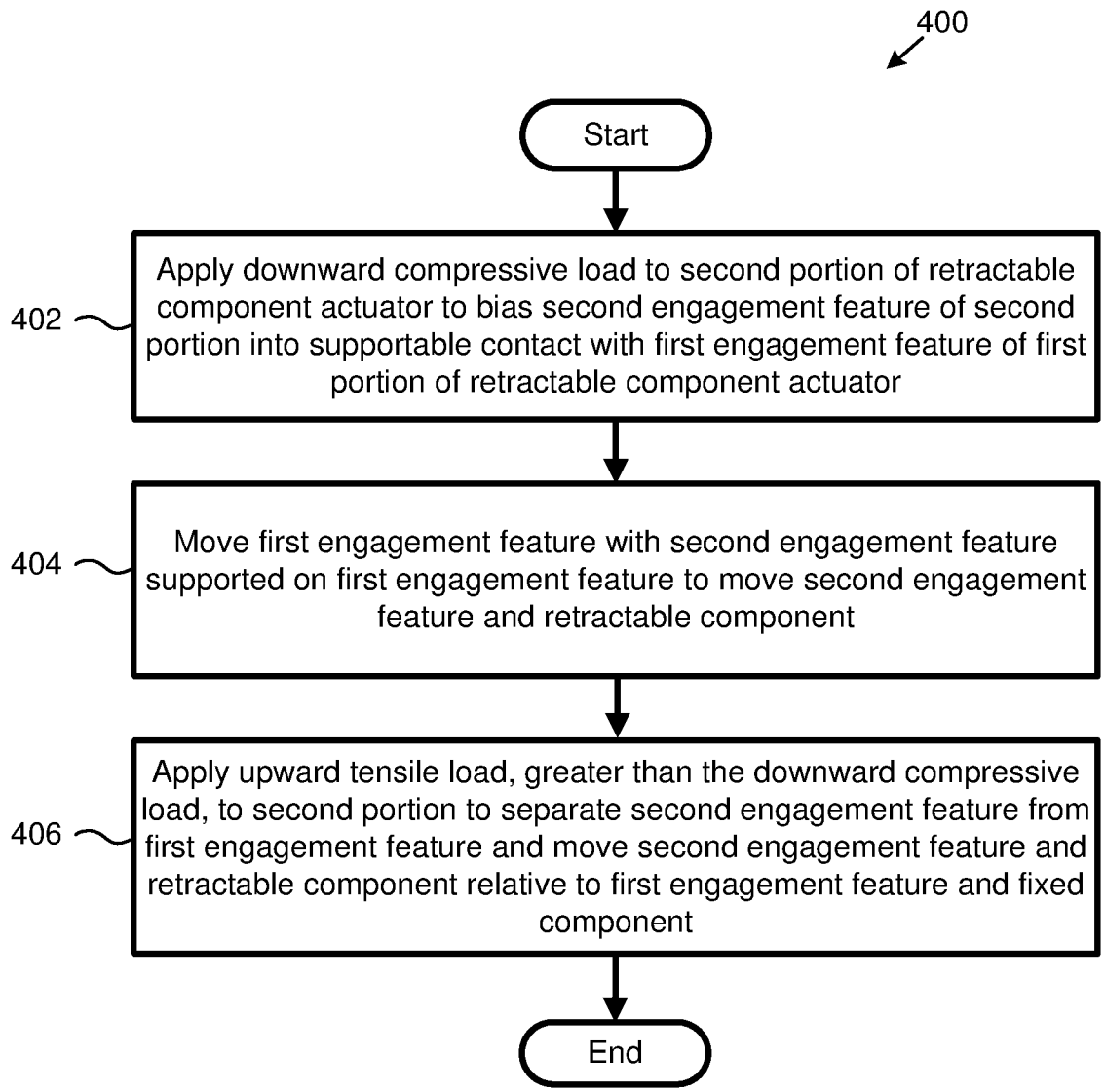
FIG. 16 is a schematic flow chart of a method of actuating a retractable component, according to one or more examples of the present disclosure.

Referring to FIG. 16, according to one embodiment, a method 400 of actuating the retractable component 104 relative to the fixed component 102 includes applying a downward compressive load 122 to the second portion 110 of the retractable component actuator 106 to bias the second engagement feature 116 of the second portion 110 into supportable contact with the first engagement feature 115 of the first portion 108 of the retractable component actuator 106 at 402. The method 400 also includes moving the first engagement feature 115 relative to the fixed component 102, with the second engagement feature 116 supported on the first engagement feature 115, to move the second engagement feature 116 and the retractable component 104 relative to the fixed component 102 at 404. The method 400 additionally includes applying the upward tensile load 126, which is greater than the downward compressive load 122, to the second portion 110 of the retractable component actuator 106 to separate the second engagement feature 116 from the first engagement feature 115 and move the second engagement feature 116 and the retractable component 104 relative to the first engagement feature 115 and the fixed component 102 at 406.

Figure 4:
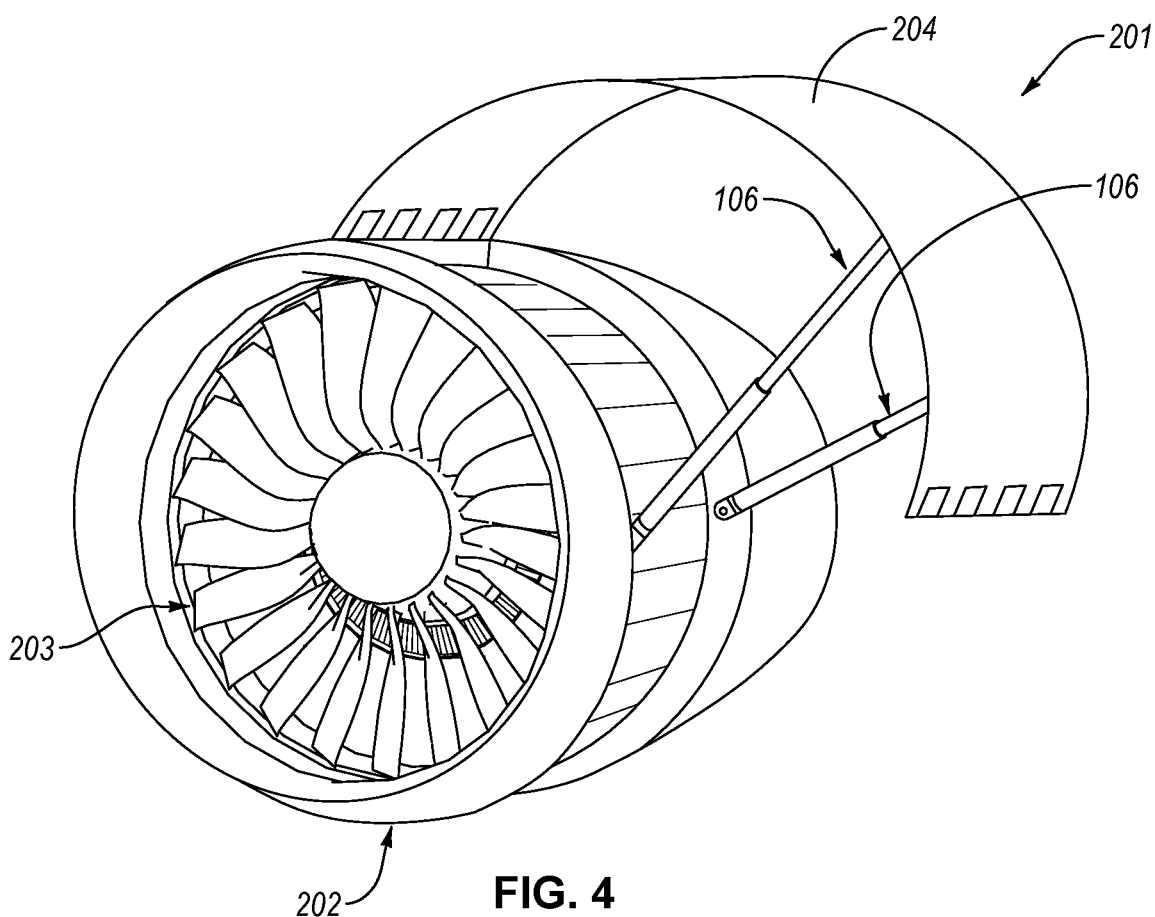
FIG. 4 is a perspective view of a nacelle of an aircraft, according to one or more examples of the present disclosure.
Figure 5:
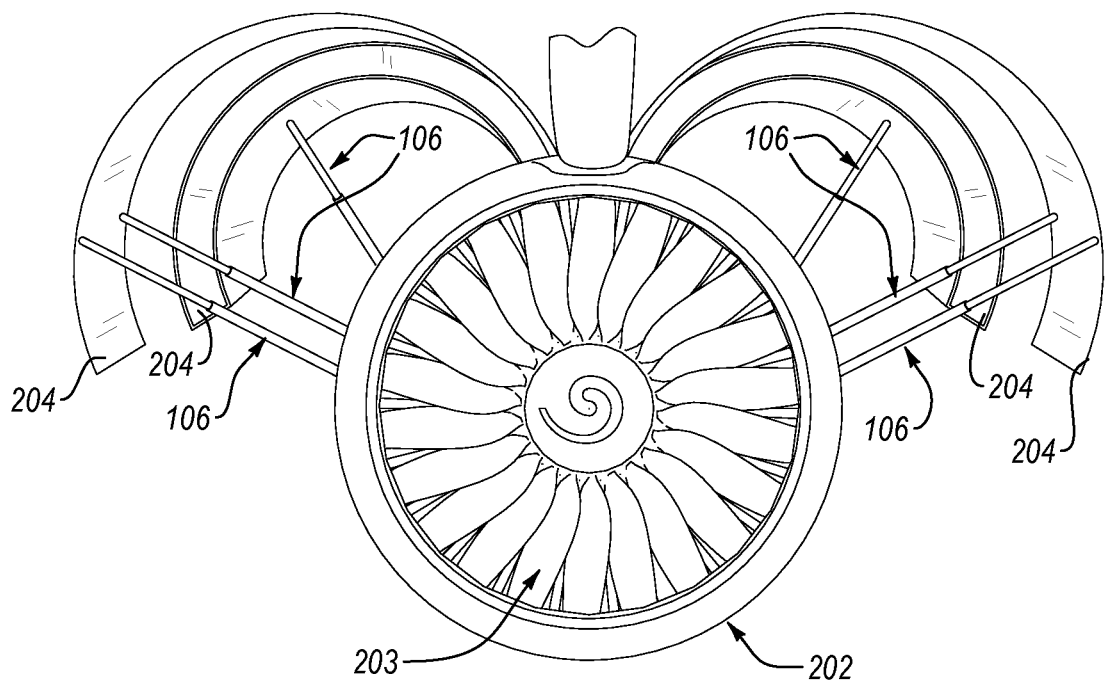
FIG. 5 is a front view of a nacelle of an aircraft, according to one or more examples of the present disclosure.
Figure 6:
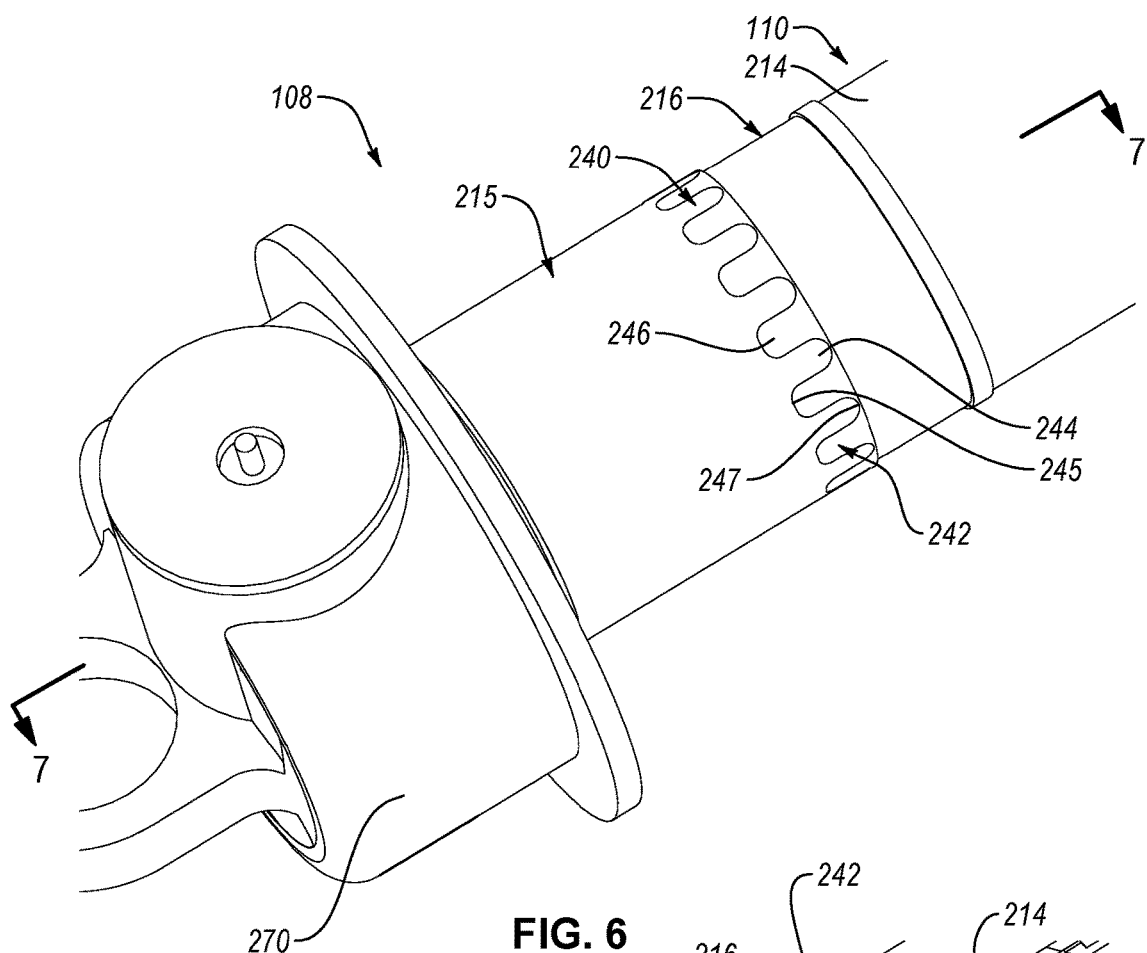
FIG. 6 is a perspective view of a portion of a retractable component actuator, according to one or more examples of the present disclosure.

Referring to FIGS. 4 and 5, in some embodiments, the retractable component system 101 is a nacelle 201 for an engine 203 of the aircraft 100. The nacelle 201 is a streamlined housing or casing around at least a portion of the engine 203. The fixed component 102 can be a base 202 and an engine 203 of the nacelle 201 and the retractable component 104 can be a door 204 (e.g., cowling door) of the nacelle 201. The door 204 is hingedly coupled to the base 202 and is movable between a closed position and an open position (as shown). When the door 204 is in the open position, the engine 203 is accessible through an opening in the base 202, which is now uncovered with the door 204 in the open position. The retractable component actuator 106 is a retractable component actuator of the nacelle 201 and is coupled to and extends between the door 204 and at least one of base 202 or the engine 203. In some implementations, the nacelle 201 includes more than one retractable component actuator 106 between the engine 203 (and/or base 202) and a door 204 of the nacelle 201. The nacelle 201 may include multiple doors 204 and multiple retractable component actuators 106 each coupled to the engine 203 (and/or base 202) and a corresponding one of the doors 204.

Figure 7:
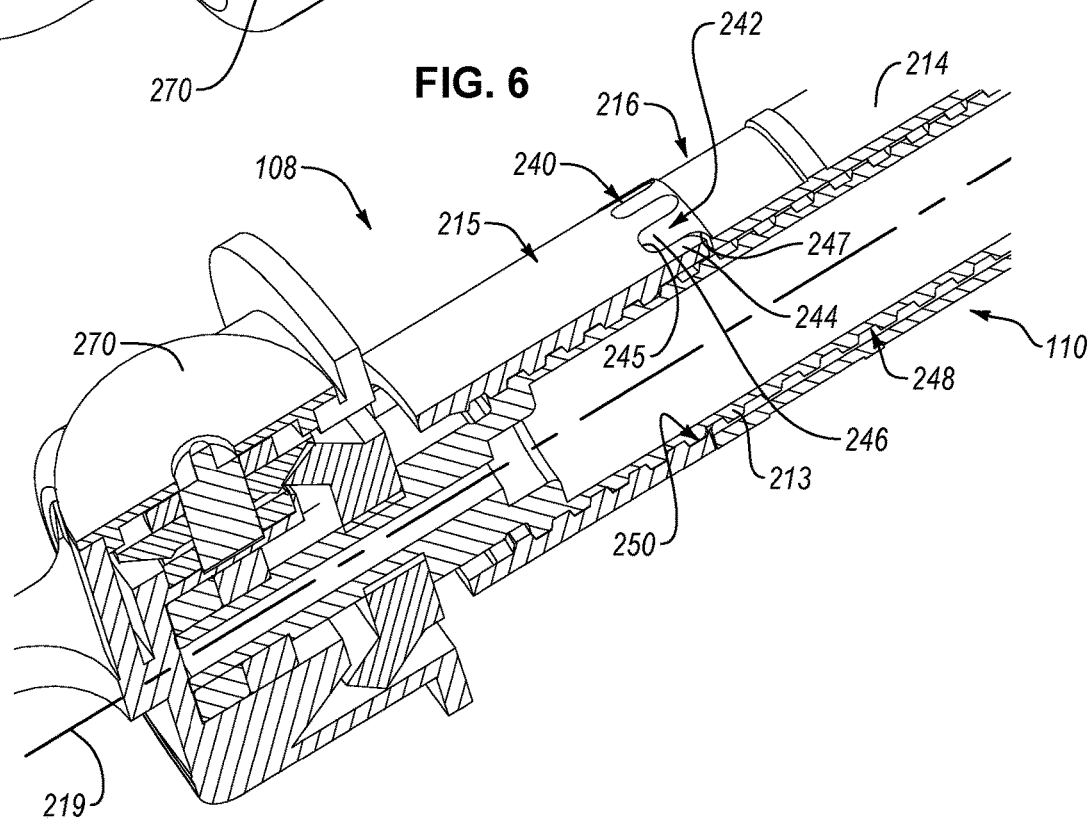
FIG. 7 is a cross-sectional perspective view of the portion of the retractable component actuator of FIG. 6, taken along the line 7-7 of FIG. 6, according to one or more examples of the present disclosure.

Now referring to FIGS. 6-13, according to one embodiment of the retractable component actuator 106 forming part of the nacelle 201, the first coupling 113 is a threaded rod 213 and the first engagement feature 115 is a sleeve 215. The automated drive mechanism 130 is a rotary power generator 230 configured to generate rotary power or torque. The rotary power generator 230 is coupled to the base 202 of the nacelle 201 or the engine 203. The threaded rod 213 includes a generator interface 270 that is co-rotatably coupled to the rotary power generator 230 to transfer rotary power from the rotary power generator 230 to the threaded rod 213. The threaded rod 213 rotates about its longitudinal axis 219, relative to the base 202, in response to receiving the rotary power from the rotary power generator 230. Moreover, as shown in FIG. 7, the threaded rod 213 includes external threads 248 extending along a substantial length of the threaded rod 213. The threaded rod 213 has a maximum outer diameter.

The sleeve 215 or nut is a hollow tubular element with a length significantly less than the length of the threaded rod 213. The sleeve 215 includes internal threads 250 threadably engaged with the external threads 248 of the threaded rod 213. The sleeve 215 may include ball bearings or other friction reducing features to facilitate rotational engagement between the sleeve 215 and the threaded rod 213. The pitch of the external threads 248 and the internal threads 250 is such that an axially directed load placed on the sleeve 215, such as the compressive load 122, does not induce rotation of the sleeve 215 relative to the threaded rod 213 and thus does not induce translational movement of the sleeve 215 axially along the threaded rod 213. The sleeve 215 also includes first interlocking features 240 (e.g., castellated features) formed in an engagement end of the sleeve 215. In one example, the first interlocking features 240 include a plurality of first tongues 244 and a plurality of first grooves 245. Each of the plurality of first grooves 245 is positioned between a corresponding two of the plurality of first tongues 244 such that the first tongues 244 and the first grooves 245 alternate about a circumference of the engagement end of the sleeve 215.

The second coupling 114 is a hollow tube 214 and the second engagement feature 116 is non-movably coupled to the hollow tube 214. The hollow tube 214 is non-rotatably fixed to the door 204 of the nacelle 201 at an upper end portion 252 of the hollow tube 214. The upper end portion 252 of the hollow tube 214 can include a bracket, or other coupling, configured to non-rotatably secure the hollow tube 214 to the door 204. In the illustrated example, the second engagement feature 116 is a lower end portion 216 of the hollow tube 214. The lower end portion 216 is opposite the upper end portion 252. The hollow tube 214 defines a cylindrical channel extending at least a substantial length of the hollow tube 214. The cylindrical channel has a minimum inner diameter just greater than the maximum outer diameter of the threaded rod 213. Moreover, the threaded rod 213 extends through the hollow tube 214, along the cylindrical channel, and is rotatable relative to the hollow tube 214 while located within the hollow tube 214. The internal surface of the hollow tube 214 defining the cylindrical channel is non-threaded. Accordingly, the hollow tube 214 is not threadably engaged with the external threads of the threaded rod 213 and is configured to translate along (e.g., be slidably engaged with) the threaded rod 213.

The lower end portion 216 of the hollow tube 214 also includes second interlocking features 242 formed in an engagement end of the hollow tube 214. In one example, the second interlocking features 242 (e.g., castellated features) include a plurality of second tongues 246 and a plurality of second grooves 247. Each of the plurality of second grooves 247 is positioned between a corresponding two of the plurality of second tongues 246 such that the second tongues 246 and the second grooves 247 alternate about a circumference of the engagement end of the lower end portion 216 of the hollow tube 214.

The first tongues 244 of the sleeve 215 are configured to support and engage (e.g., mate with, nestably engage, etc.) corresponding second grooves 247 of the hollow tube 214 and the second tongues 246 of the hollow tube 214 are configured to engage corresponding first grooves 245 of the sleeve 215 to releasably non-rotatably engage the first portion 108 and the second portion 110. The interlocking features can be chamfered or rounded to facilitate self-alignment of the interlocking features. In other words, engagement between the first interlocking features 140 of the sleeve 215 and the second interlocking features 142 of the hollow tube 214, when the hollow tube 214 is supported on the sleeve 215, prevents relative rotation between the sleeve 215 and the hollow tube 214. Accordingly, because the door 204 prevents the hollow tube 214 from rotating relative to the door 204 and the base 202, engagement between the first interlocking features 140 of the sleeve 215 and the second interlocking features 142 of the hollow tube 214 prevents rotation of the sleeve 215 relative to the door 204 and the base 202. Although the first interlocking features 140 and the second interlocking features 142 are depicted as alternating and inter-engageable tongues and grooves, in other examples, the first interlocking features 140 and the second interlocking features 142 can be other features that prevent relative rotation when engaged while freely allowing translational disengagement. In contrast, when the first interlocking features 140 and the second interlocking features 142 are not engaged, the sleeve 215 is free to rotate relative to the door 204 and the base 202.

Referring in particular to FIGS. 8-13, the retractable component actuator 106 is shown in various stages and modes of operation. In FIGS. 8-11, the retractable component actuator 106 is shown in various stages of the power mode of operation. In contrast, in FIGS. 12 and 13, the retractable component actuator 106 is shown in two stages of the manual mode of operation.

Figure 8:
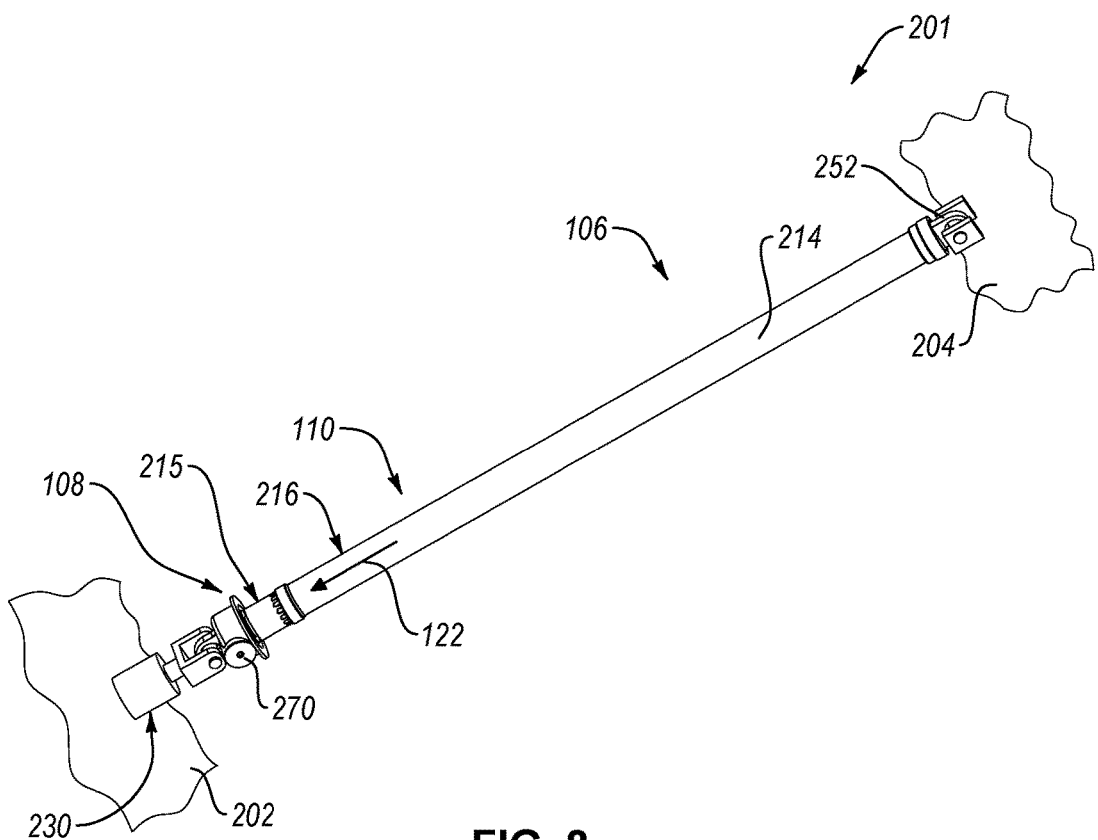
FIG. 8 is a perspective view of a nacelle of an aircraft, with a retractable component actuator in a retracted position, according to one or more examples of the present disclosure.

Referring to FIG. 8, the retractable component actuator 106 is shown in a retracted position corresponding to the door 204 being in a closed position. The door 204 applies the compressive load 122 to the retractable component actuator 106 to force the lower end portion 216 of the hollow tube 214 into contact with the sleeve 215, which supports the hollow tube 214 and the door 204.

Figure 9:
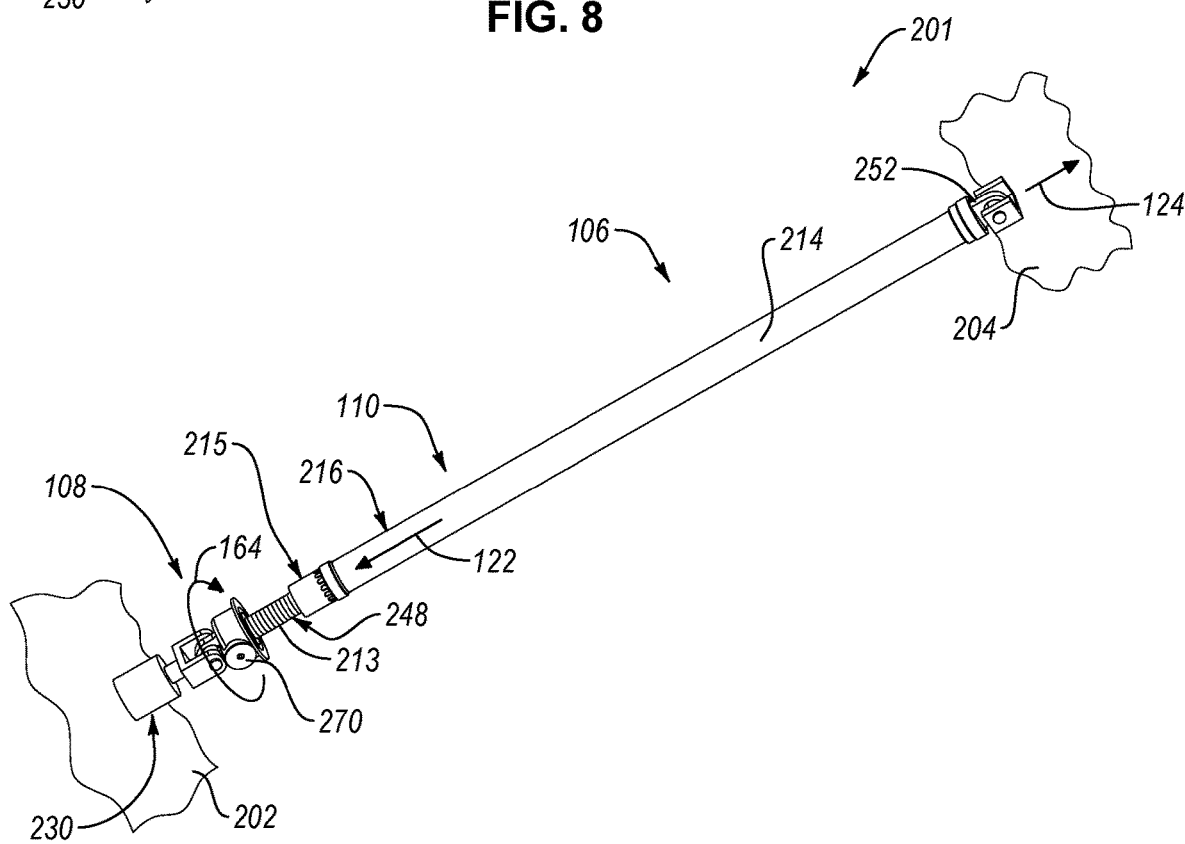
FIG. 9 is a perspective view of the nacelle of FIG. 8, with the retractable component actuator in an intermediate position, according to one or more examples of the present disclosure.

Now referring to FIG. 9, in the power mode, the retractable component actuator 106 is extended to open the door 204 by selectively operating the rotary power generator 230 to rotate the threaded rod 213 in a first rotational direction (e.g., counter-clockwise direction) relative to the base 202 and the door 204. Due to engagement between the lower end portion 216 of the hollow tube 214 and the sleeve 215, the sleeve 215 is prevented from rotation relative to the base 202 and the door 204. Accordingly, as the threaded rod 213 rotates in the first rotational direction, the sleeve 215 linearly translates along the threaded rod 213 away from the base 202 in the direction indicated by directional arrow 124. With the hollow tube 214 supported on the sleeve 215, the hollow tube 214 also translates (e.g., slides) along the threaded rod 213 away from the base 202 in the same direction, which causes the door 204 to correspondingly move away from the base 202 and toward an open position.

Figure 10:
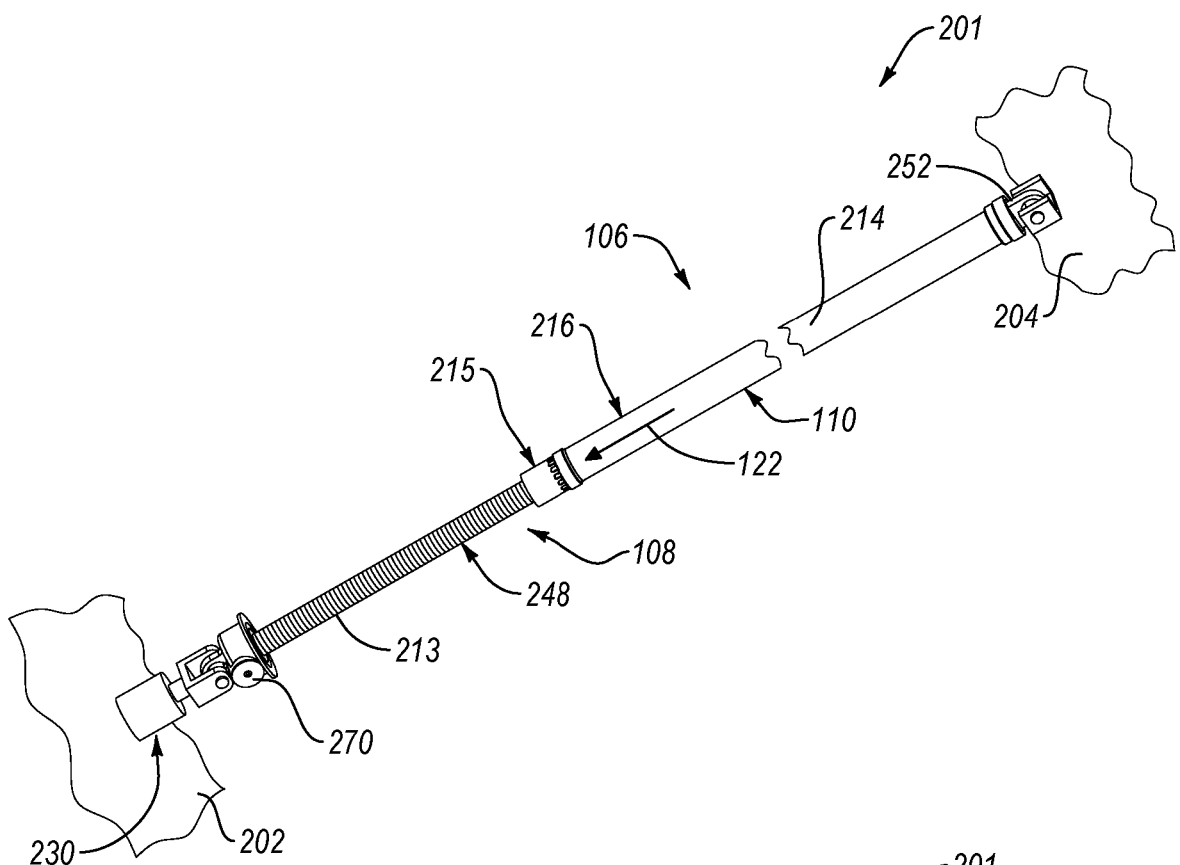
FIG. 10 is a perspective view of the nacelle of FIG. 8, with the retractable component actuator in an extended position, according to one or more examples of the present disclosure.

As shown in FIG. 10, the sleeve 215 and hollow tube 214 have translated along the threaded rod 213 to fully extend the retractable component actuator 106 and place the door 204 in the open position. Due to the threaded engagement between the sleeve 215 and the threaded rod 213, the sleeve 215 is temporarily fixed in place on the threaded rod 213, which maintains the door 204 in the open position and allows operators to access the engine 203 protected by the nacelle 201. In fact, the sleeve 215 is effectually temporarily fixed in place at any position along the threaded rod 213 as it translates along the threaded rod 213.

Figure 11:
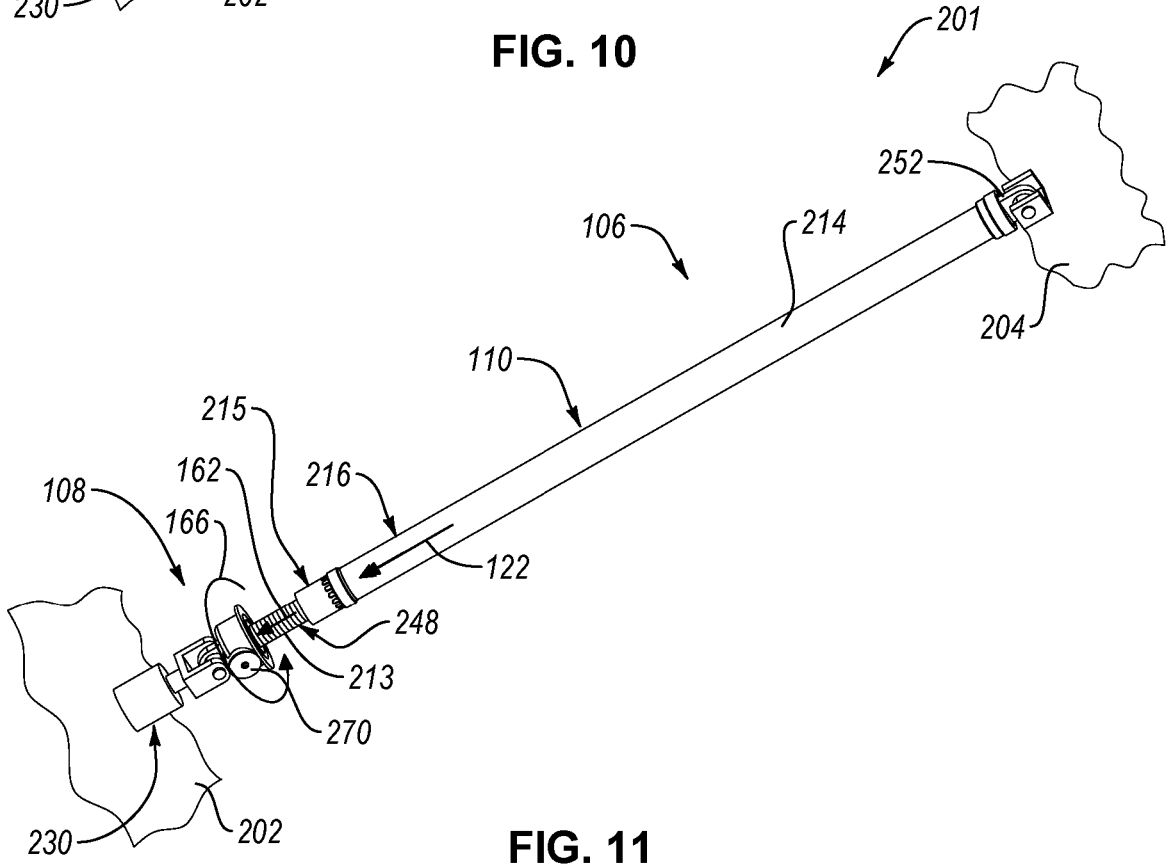
FIG. 11 is a perspective view of the nacelle of FIG. 8, with the retractable component actuator in an intermediate position, according to one or more examples of the present disclosure.

Referring to FIG. 11, in the power mode, the door 204 can be closed from a partially open position or the open position by retracting the retractable component actuator 106. The retractable component actuator 106 is retracted in the power mode to close the door 204 by selectively operating the rotary power generator 230 to rotate the threaded rod 213 in a second rotational direction (e.g., clockwise direction) relative to the base 202 and the door 204. The second rotational direction is opposite the first rotational direction. As the threaded rod 213 rotates in the second rotational direction, the sleeve 215 linearly translates along the threaded rod 213 toward the base 202 in the direction indicated by directional arrow 162. With the hollow tube 214 supported on the sleeve 215, the hollow tube 214 also translates (e.g., slides) along the threaded rod 213 toward the base 202 in the same direction, which causes the door 204 to correspondingly move toward the base 202 and toward the closed position.

Figure 12:
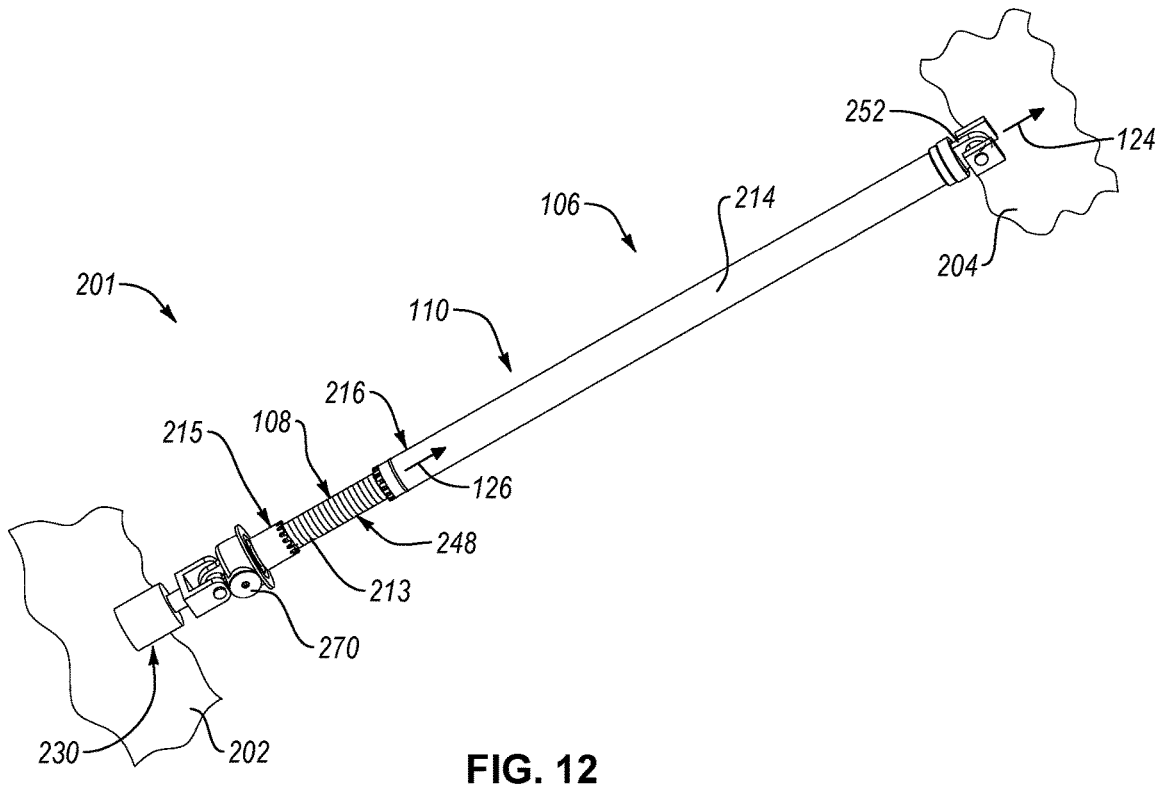
FIG. 12 is a perspective view of the nacelle of FIG. 8, with the retractable component actuator operating in a manual mode and a retractable component in a partially open position, according to one or more examples of the present disclosure.
Figure 13:
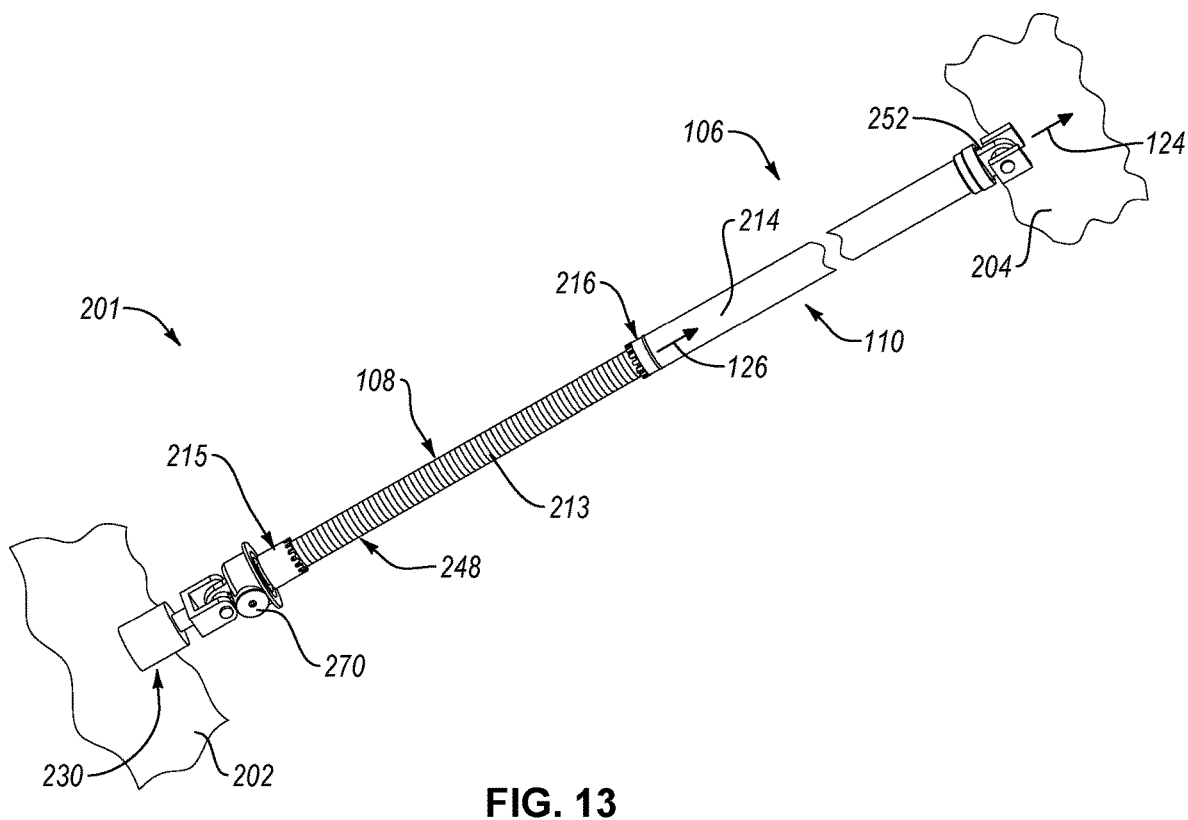
FIG. 13 is a perspective view of the nacelle of FIG. 8, with the retractable component actuator operating in a manual mode and the retractable component in an open position, according to one or more examples of the present disclosure.

Now referring to FIGS. 12 and 13, in the manual mode, the retractable component actuator 106 is extended to open the door 204 by applying to the door 204 an upward tensile load 126 that is greater than the downward compressive load 122. Because supporting engagement between the lower end portion 216 of the hollow tube 214 and the sleeve 215 does not constrain movement of the hollow tube 214 away from the sleeve 215, the net tensile load applied to the retractable component actuator 106 causes the hollow tube 214 to separate from the sleeve 215 and move the door 204 away from the sleeve 215 and the base 202 in the direction indicated by directional arrow 124. Although not shown, in the manual mode, the retractable component actuator 106 can be retracted to close the door 204 by decreasing the upward tensile load 126 applied to the door. Decreasing the upward tensile load 126 lowers the hollow tube 214 and the door 204 relative to the base 202 until the hollow tube 214 contacts and is supported on the sleeve 215.

Figure 14:
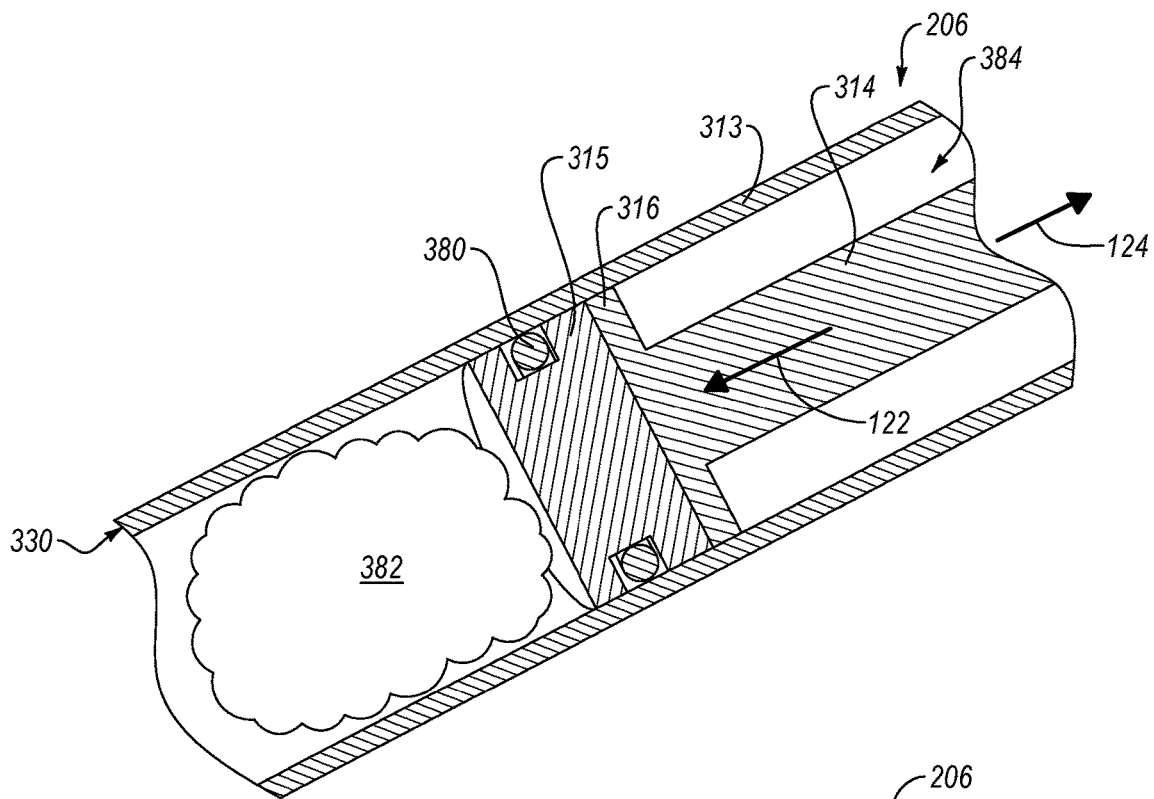
FIG. 14 is a cross-sectional perspective view of a retractable component actuator, shown operating in a power mode, according to one or more examples of the present disclosure.
Figure 15:
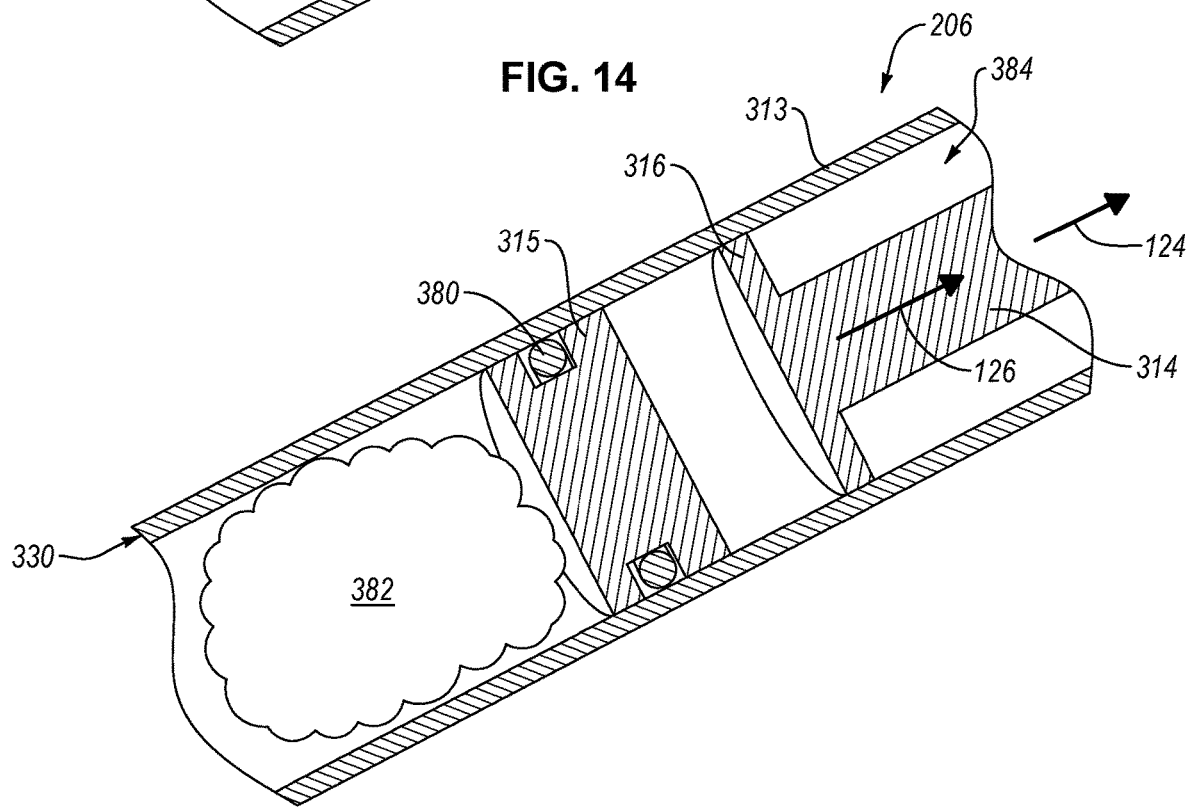
FIG. 15 is a cross-sectional perspective view of the retractable component actuator of FIG. 14, shown operating in a manual mode, according to one or more examples of the present disclosure.

Referring to FIGS. 14 and 15, according to another embodiment of the retractable component actuator 106, the first coupling 113 is a chamber housing 313 and the first engagement feature 115 is a first piston 315. The first piston 315 is within, translationally movable along, and sealed to the chamber housing 313. More specifically, the chamber housing 313 defines a piston chamber 384 within which the first piston 315 is translationally movable. The automated drive mechanism 130 is a linear actuator 330 configured to linearly translate the first piston 315 toward and away from the fixed component 102, which can be the base 202 of the nacelle 201. The linear actuator 330 can be any of various linear actuators, such as hydraulically-powered linear actuators, electrically-powered linear actuators, electromagnetically-powered linear actuators, pneumatically-powered linear actuators, and the like. In the illustrated example, the linear actuator 330 is depicted as a hydraulically-powered linear actuator with a hydraulic fluid 382 that is adjustably pressurized to linearly translate the first piston 315 along the chamber housing 313. The linear actuator 330 is coupled to the fixed component 102.

In the illustrated embodiment, the first piston 315 forms a seal against the piston chamber 384 to prevent leakage of the hydraulic fluid 382 around the first piston 315. In some examples, the first piston 315 includes at least one seal 380 that elastomerically deforms against the interior surface of the piston chamber 384 to form the seal against the piston chamber 384. The seal 380 can be any of various seals, such as gaskets, o-rings, etc., that are capable for forming a seal while allowing movement of the seal 380 relative to the surface against which the seal is formed. The first piston 315 includes a first engagement surface that is flat in some examples.

In the embodiment of FIGS. 14 and 15, the second coupling 114 is a rod 314 and the second engagement feature 116 is a second piston 316 non-movably coupled to the rod 314. The rod 314 is non-rotatably fixed to the retractable component 104, which can be the door 204 of the nacelle 201, at an upper end opposite the lower end coupled to the second piston 316. The upper end of the rod 314 can include a bracket, or other coupling, configured to non-rotatably secure the rod 314 to the retractable component 104. The second piston 316 is within the piston chamber 384 and translationally movable along the chamber housing 313. The second piston 316 includes a second engagement surface that is configured to engage and be supported on (e.g., complements) the first engagement surface of the first piston 315. The second engagement surface of the second piston 316 is flat in some examples. Supported engagement between the first piston 315 and the second piston 316 need not prevent relative rotation between the first piston 315 and the second piston 316 in some examples. However, engagement between the first piston 315 and the second piston 316 allows the second piston 316 to be freely movable or separable away from the first piston 315 and the fixed component 102. In other words, the first piston 315 does not constrain movement of the second piston 316 away from the first piston 315 and the fixed component 102 when the second piston 316 is supported on the first piston 315.

In FIG. 14, the retractable component actuator 106 is shown operating in the power mode. The retractable component 104 applies the compressive load 122 to the retractable component actuator 106 to force the second piston 316 into contact with the first piston 315, which supports the second piston 316, the rod 314, and the retractable component 104. The retractable component actuator 106 is extended to actuate the retractable component 104 by selectively operating the linear actuator 330 to move the first piston 315 away from or towards the fixed component 102. With the second piston 316 supported on the first piston 315, the second piston 316 and the rod 314 also translate along the chamber housing 313 away from the fixed component 102 in the same direction as the first piston 315, which causes the retractable component 104 to correspondingly move away in the same direction as the first piston 315.

Referring to FIG. 15, in the manual mode, the retractable component actuator 106 is extended, to move the retractable component 104 away from the fixed component 102 by applying to the retractable component 104 an upward tensile load 126 that is greater than the downward compressive load 122. Because supporting engagement between the first piston 315 and the second piston 316 does not constrain movement of the second piston 316 away from the first piston 315, the net tensile load applied to the retractable component actuator 106 causes the second piston 316 to separate from the first piston 315 and move the retractable component 104 away from the first piston 315 and the fixed component 102 in the direction indicated by directional arrow 124. Although not shown, in the manual mode, the retractable component actuator 106 of FIG. 15 can be retracted to move the retractable component 104 toward the fixed component 102 by decreasing the upward tensile load 126 applied to the retractable component 104. Decreasing the upward tensile load 126 lowers the second piston 316 and the retractable component 104 relative to the fixed component 102 until the second piston 316 contacts and is supported on the first piston 315.

In view of the foregoing, the retractable component actuator 106 can be selectively switched between the power mode and the manual mode as desired or as is necessary. Generally, in one example, the retractable component actuator 106 will be operated in the power mode unless operation in the manual mode is necessitated, such as due to disablement of the power mode of the retractable component actuator 106.

Although the exemplary embodiment of the retractable component system 101 is a nacelle of an aircraft and the retractable component 104 is a door of the nacelle, in other embodiments, the retractable component system 101 can be another system of an aircraft and the door can be another door of the aircraft, such as a cargo door.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A retractable component actuator, comprising:
a first portion fixable to a fixed component and comprising a first engagement feature, the first engagement feature comprising first interlocking features;
a second portion fixable to a retractable component and comprising a second engagement feature releasably supportable on the first engagement feature, the second engagement feature comprising second interlocking features; and
an automated drive mechanism operably coupled to the first portion and operable to move the first engagement feature upward and downward relative to the fixed component when the first portion is fixed to the fixed component and when the retractable component is movable upward and downward relative to the fixed component;
wherein, when the retractable component is movable upward and downward relative to the fixed component:
downward movement of the second engagement feature relative to the first engagement feature is constrained by the first engagement feature;
upward movement of the second engagement feature relative to the first engagement feature is unconstrained by the first engagement feature;
when the second engagement feature is supported on the first engagement feature and the first portion is fixed to the fixed component, the second engagement feature is upwardly and downwardly co-movable, relative to the fixed component, with the first engagement feature;

the first interlocking features engage with the second interlocking features when the second engagement feature is supported on the first engagement feature; and the first interlocking features and the second interlocking features, when engaged, are configured to prevent rotation of the first portion relative to the second portion and to freely allow translational disengagement of the second portion from the first portion.

2. The retractable component actuator according to claim 1, wherein, when upward movement of the second engagement feature is against gravity, the second engagement feature is biased into supportable contact with the first engagement feature by gravity.

3. The retractable component actuator according to claim 1, wherein the second engagement feature is freely manually movable upwardly away from the first engagement feature.

4. The retractable component actuator according to claim 1, wherein:
when the first portion is fixed to the fixed component, the retractable component actuator is operable in a manual mode and a power mode to move the second engagement feature upwardly away from the fixed component;
the manual mode comprises separating the second engagement feature upwardly away from the first engagement feature; and
the power mode comprises upwardly co-moving the first engagement feature and the second engagement feature via the automated drive mechanism.

5. The retractable component actuator according to claim 1, wherein:
the first portion further comprises a threaded rod;
the first engagement feature comprises a sleeve threadably engaged with the threaded rod; and
rotation of the threaded rod relative to the sleeve translates the sleeve along the threaded rod and moves the sleeve relative to the fixed component when the first portion is fixed to the fixed component.

6. The retractable component actuator according to claim 5, wherein:
the second portion comprises a hollow tube;
the second engagement feature is non-movably coupled to the hollow tube; and
the threaded rod extends through and is rotatable relative to the hollow tube.

7. The retractable component actuator according to claim 6, wherein, when the second engagement feature is supported on the first engagement feature, rotation of the threaded rod relative to the sleeve and the hollow tube translates the hollow tube along the threaded rod and moves the threaded rod relative to the fixed component when the first portion is fixed to the fixed component.

8. The retractable component actuator according to claim 6, wherein the hollow tube is slidably non-threadably engaged with the threaded rod.

9. The retractable component actuator according to claim 6, wherein when the first portion is fixed to the fixed component and the second portion is fixed to the retractable component:
the threaded rod is rotatable relative to the fixed component and the retractable component;
the hollow tube is non-rotatable relative to the fixed component and the retractable component; and when the second engagement feature is supported on the first engagement feature, the sleeve is non-rotatable relative to the fixed component and the retractable component.

10. The retractable component actuator according to claim 9, wherein:
the first interlocking features of the first engagement feature comprise first tongues and first grooves formed in the sleeve;
the second interlocking features of the second engagement feature comprise second tongues and second grooves formed in the hollow tube; and
the first tongues engage corresponding second grooves and the second tongues engage corresponding first grooves to releasably engage the first portion and the second portion.

11. The retractable component actuator according to claim 10, wherein engagement between the first tongues and the second grooves and engagement between the second tongues and the first grooves prevents relative rotation between the sleeve and the hollow tube.

12. The retractable component actuator according to claim 9, wherein when the second engagement feature is not supported on the first engagement feature, the sleeve is rotatable relative to the fixed component and the retractable component.

13. The retractable component actuator according to claim 5, wherein the automated drive mechanism comprises a rotary power generator.

14. The retractable component actuator according to claim 1, wherein:
the first portion further comprises a chamber housing;
the first engagement feature comprises a first piston within, translationally movable along, and sealed to the chamber housing;
the second portion further comprises a second piston within and translationally movable along the chamber housing; and
the second portion further comprise a rod co-movably coupled to the second piston and fixable to the retractable component.

15. The retractable component actuator according to claim 14, wherein the automated drive mechanism comprises a linear actuator.

16. A nacelle for an engine of an aircraft, the nacelle comprising:
a base;
a door movably coupled to the base and movable between a closed position and an open position; and
a retractable component actuator coupled to and extending between the door and at least one of the base and the engine, the retractable component actuator being operable to move the door between the closed position and the open position, wherein the retractable component actuator comprises:
a first portion fixable to a fixed component and comprising a first engagement feature, the first engagement feature comprising first interlocking features;
a second portion fixable to a retractable component and comprising a second engagement feature releasably supportable on the first engagement feature, the second engagement feature comprising second interlocking features; and
an automated drive mechanism operably coupled to the first portion and operable to move the first engagement feature upward and downward relative to the fixed component when the first portion is fixed to the fixed component and when the door is movable upward and downward relative to the base;

wherein, when the door is movable upward and downward relative to the base:
- downward movement of the second engagement feature relative to the first engagement feature is constrained by the first engagement feature;
- upward movement of the second engagement feature relative to the first engagement feature is unconstrained by the first engagement feature;
- when the second engagement feature is supported on the first engagement feature and the first portion is fixed to the fixed component, the second engagement feature is upwardly and downwardly co-movable, relative to the fixed component, with the first engagement feature;
- the first interlocking features engage with the second interlocking features when the second engagement feature is supported on the first engagement feature; and
- the first interlocking features and the second interlocking features, when engaged, are configured to prevent rotation of the first portion relative to the second portion and to freely allow translational disengagement of the second portion from the first portion.

17. The nacelle according to claim 16, wherein, when upward movement of the door is against gravity and downward movement of the door is assisted by gravity:
- the door applies a downward compressive load onto the second portion; and
- the downward compressive load biases the second engagement feature into supportable contact with the first engagement feature.

18. A method of actuating a retractable component relative to a fixed component, the method comprising:
- applying a downward compressive load to a second portion of a retractable component actuator to bias a second engagement feature of the second portion into supportable contact with a first engagement feature of a first portion of the retractable component actuator;
- moving the first engagement feature relative to the fixed component, with the second engagement feature supported on the first engagement feature, to move the second engagement feature and the retractable component relative to the fixed component; and
- applying an upward tensile load, greater than the downward compressive load, to the second portion of the retractable component actuator to separate the second engagement feature from the first engagement feature and move the second engagement feature and the retractable component relative to the first engagement feature and the fixed component;

wherein:
- the first portion is fixed to the fixed component and the first engagement feature comprises first interlocking features;
- the second portion is fixed to the retractable component and the second engagement feature comprises second interlocking features; and
- an automated drive mechanism is operably coupled to the first portion and is operable to move the first engagement feature relative to the fixed component;

when the retractable component is movable upward and downward relative to the fixed component:
- downward movement of the second engagement feature relative to the first engagement feature is constrained by the first engagement feature;
- upward movement of the second engagement feature relative to the first engagement feature is unconstrained by the first engagement feature;
- when the second engagement feature is supported on the first engagement feature and the first portion is fixed to the fixed component, the second engagement feature is upwardly and downwardly co-movable, relative to the fixed component, with the first engagement feature;
- the first interlocking features engage with the second interlocking features when the second engagement feature is supported on the first engagement feature; and
- the first interlocking features and the second interlocking features, when engaged, are configured to prevent rotation of the first portion relative to the second portion and to freely allow translational disengagement of the second portion from the first portion.

19. The method according to claim 18, wherein:
the first portion further comprises a threaded rod;
the first engagement feature comprises a sleeve threadably engaged with the threaded rod;
the second portion comprises a hollow tube fixed to the retractable component;
the second engagement feature is non-movably coupled to the hollow tube;
the threaded rod extends through and is rotatable relative to the hollow tube; and
moving the first engagement feature relative to the fixed component comprises rotating the threaded rod relative to the sleeve to translate the sleeve and the hollow tube along the threaded rod.

20. The method according to claim 18, wherein:
the first portion further comprises a chamber housing;
the first engagement feature comprises a first piston within, translationally movable along, and sealed to the chamber housing;
the second portion further comprises a second piston within and translationally movable along the chamber housing;
the second portion further comprises a rod co-movably coupled to the second piston and fixed to the retractable component; and
moving the first engagement feature relative to the fixed component comprises hydraulically driving the first piston and the second piston along the chamber housing.

* * * * *